United States Patent [19]
Norby et al.

[11] Patent Number: 5,756,903
[45] Date of Patent: May 26, 1998

[54] TRACK STRENGTH TESTING VEHICLE WITH A LOADED GAGE AXLE AND LOADED GAGE AXLE APPARATUS

[75] Inventors: Robert V. Norby. Munster; Stefan T. Pendrick. Hammond. both of Ind.

[73] Assignee: Holland Company. Chicago Heights, Ill.

[21] Appl. No.: 755,780

[22] Filed: Nov. 22, 1996

Related U.S. Application Data

[60] Provisional application No. 60/007,462 Nov. 22, 1995.

[51] Int. Cl.$^6$ .................................................. G01M 5/00
[52] U.S. Cl. .......................... 73/786; 73/146; 105/215.2; 105/72.2
[58] Field of Search ................... 105/215.2, 72.2; 73/786, 788, 862.631, 862.541, 636, 146

[56] References Cited

U.S. PATENT DOCUMENTS

| | | | |
|---|---|---|---|
| 2,718,197 | 9/1955 | Bock et al. | 105/215 |
| 3,020,858 | 2/1962 | Perksins et al. | 105/215 |
| 3,249,067 | 5/1966 | Keller | 105/215 |
| 3,263,628 | 8/1966 | Grove et al. | 105/215 |
| 3,503,339 | 3/1970 | Kershaw | 105/215 |
| 3,581,671 | 6/1971 | Hart | 105/215 |
| 3,804,025 | 4/1974 | Elliott | 105/215 C |
| 3,896,665 | 7/1975 | Goel | 73/146 |
| 3,980,025 | 9/1976 | Olson, Sr. et al. | 105/215 C |
| 4,044,594 | 8/1977 | Owens et al. | 73/636 X |
| 4,468,966 | 9/1984 | Bradshaw | 73/636 |
| 4,534,297 | 8/1985 | Johnson, Sr. | 105/215 C |
| 4,662,224 | 5/1987 | Turbe | 73/636 |
| 4,708,066 | 11/1987 | Heckman | 105/215.2 |
| 5,186,109 | 2/1993 | Madison | 105/215.2 |
| 5,339,692 | 8/1994 | Shoenhair et al. | 73/636 |
| 5,386,727 | 2/1995 | Searle | 73/636 X |
| 5,522,265 | 6/1996 | Jaggi | 73/636 X |
| 5,617,639 | 4/1997 | Perry | 73/146 X |
| 5,627,508 | 5/1997 | Cooper et al. | 73/636 X |

*Primary Examiner*—Elizabeth L. Dougherty
*Attorney, Agent, or Firm*—Lee, Mann, Smith, McWilliams, Sweeney & Ohlson

[57] ABSTRACT

A motor vehicle body is adapted for use on railroad tracks by being elevated by "high rail" unit steel wheels, but with the motive force being supplied by the vehicle's road wheels, a loaded gage axle assembly having vertical loads imposed by hydraulic rams, and horizontal loads being supplied by horizontal rams through split axles and steel wheels to the railroad tracks is calibrated to measure track strength and adapted to be operatively connected to electronic data recording and comparing apparatus.

11 Claims, 4 Drawing Sheets

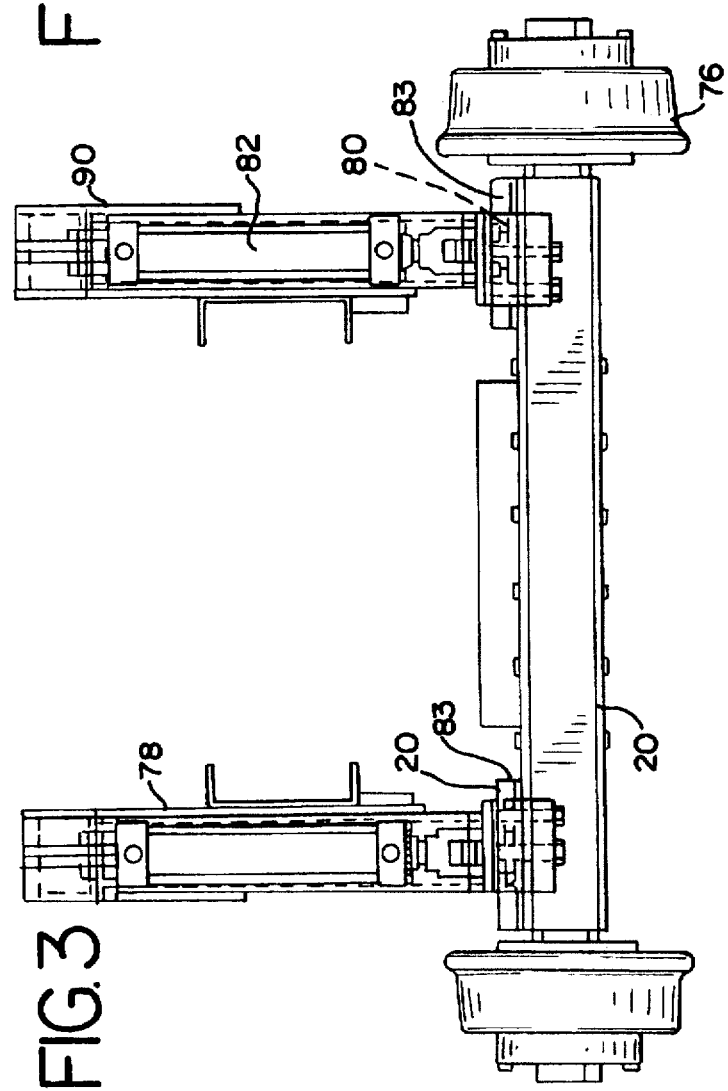
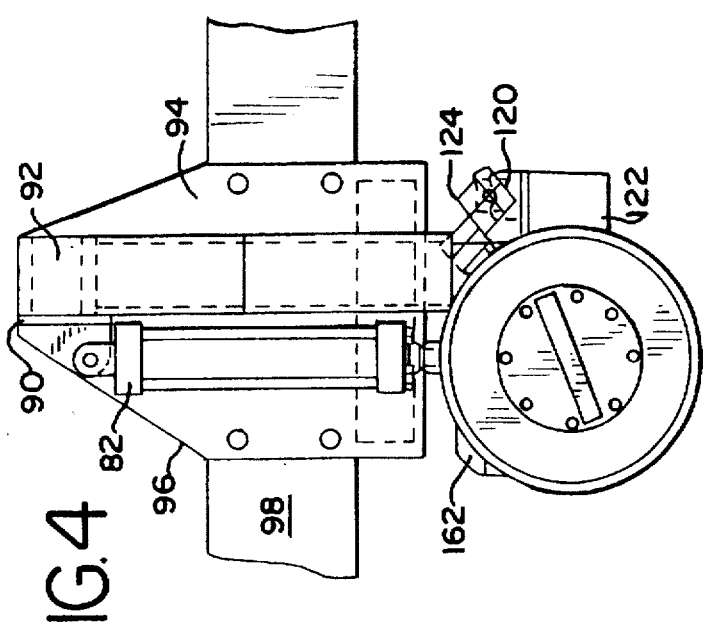
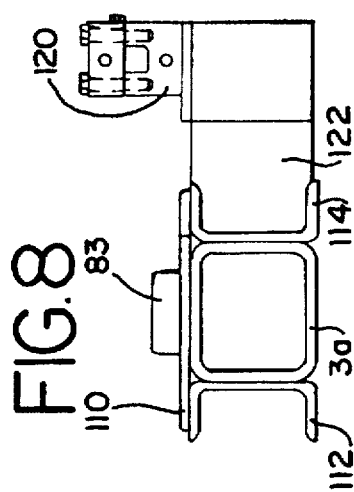
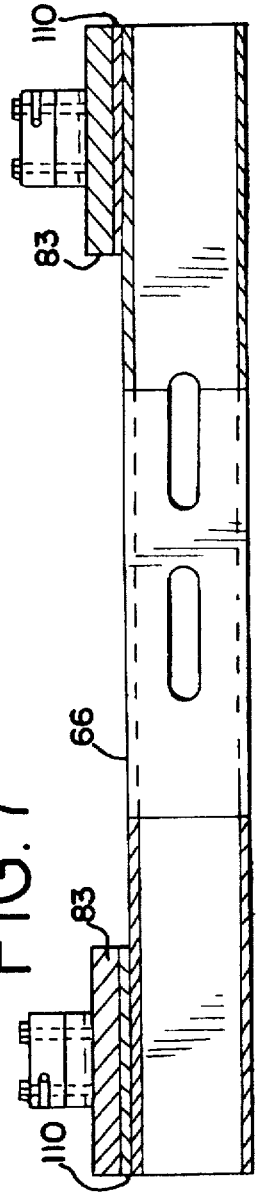

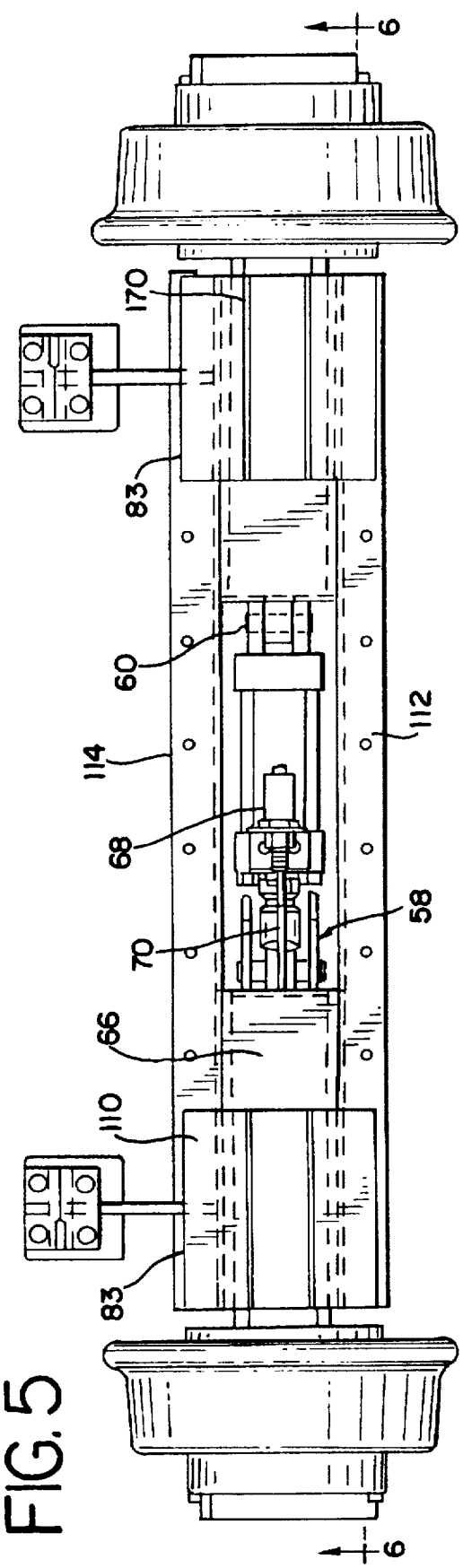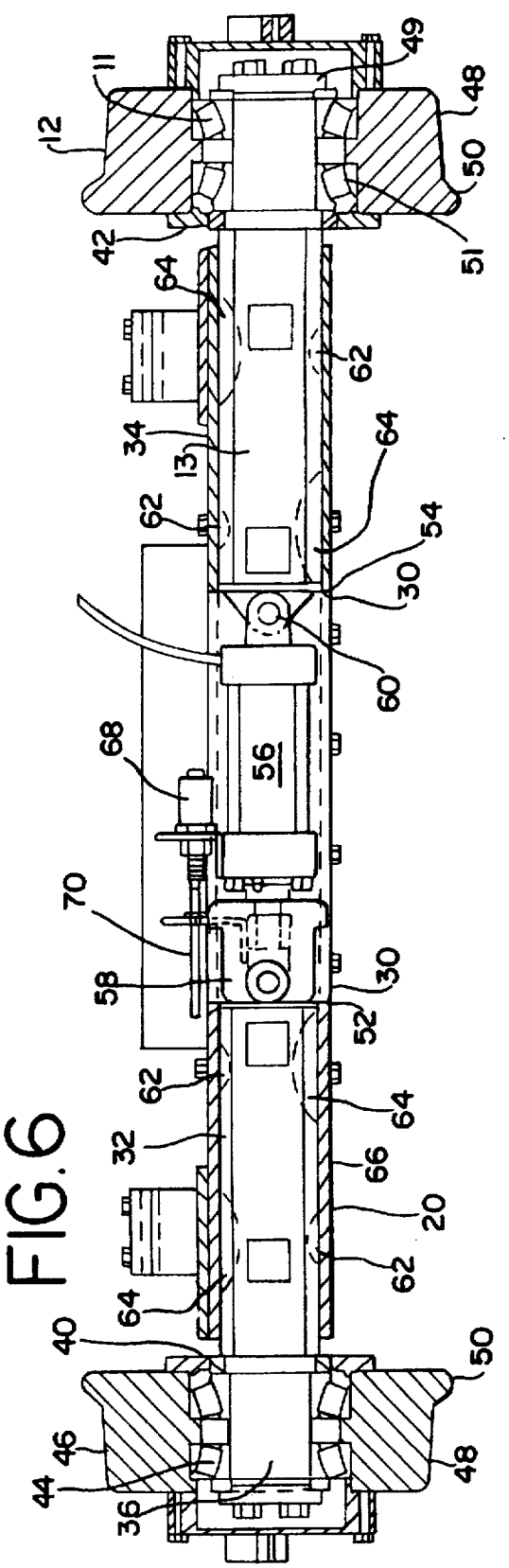

TRACK STRENGTH TESTING VEHICLE WITH A LOADED GAGE AXLE AND LOADED GAGE AXLE APPARATUS

RELATED APPLICATION

This application claims priority based on provisional application Serial No. 60/007,462 filed on Nov. 22, 1995.

BACKGROUND OF THE INVENTION

1. Field of the Invention

The invention relates to a vehicle used for testing the track strength of railroad tracks using a loaded gage axle assembly which imparts a calibrated downward force and a calibrated outward force on the rails, and measures the displacement of the rails to determine the strength of the rails.

2. Description of Related Art

Prior art includes a "Gage Restraint Measurement System (GRMS)" from the U.S. Department of Transportation also described in an article entitled "AAR's Track Loading Vehicle" and a testing vehicle produced jointly by companies under the name Plasser-Ensco. This prior art is for railcar mounted testing apparatus.

Motor (road) vehicle mounted testing apparatus includes the "Tru-Test T.L.V." Tiescan, Inc. "Track Strength Analysis and Recording (TSAR) Inspection System". These all use steel "high-rail" wheels to both support the road vehicle on the rails and to provide drive force through a power takeoff to the vehicle transmission and engine to move the vehicle. These all mount the testing apparatus at the rear of a motor vehicle (road truck) body and use differently configured load gage apparatus.

BRIEF DESCRIPTION OF DRAWINGS

FIG. 3 is a front elevational view of the loaded gage axle track strength apparatus.

FIG. 4 is a left side elevational view of the loaded gage axle track strength apparatus.

FIG. 5 is a top plan view of the loaded gage axle track strength apparatus.

FIG. 6 is a front sectional view of the loaded gage axle track strength apparatus.

FIG. 7 is a front sectional view of the loaded gage axle track strength apparatus.

FIG. 8 is a left side sectional view of the loaded gage axle track strength apparatus.

DESCRIPTION OF PREFERRED EMBODIMENT

Figure 2:
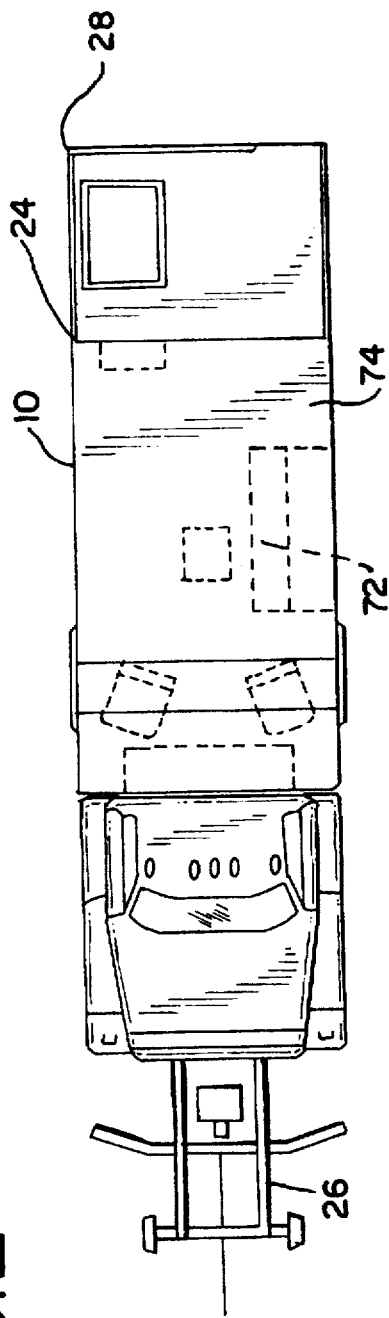
FIG. 2 is a top plan view of the motor vehicle body and loaded gage axle track strength apparatus with the body portion in section to show the arrangements.
Figure 1:
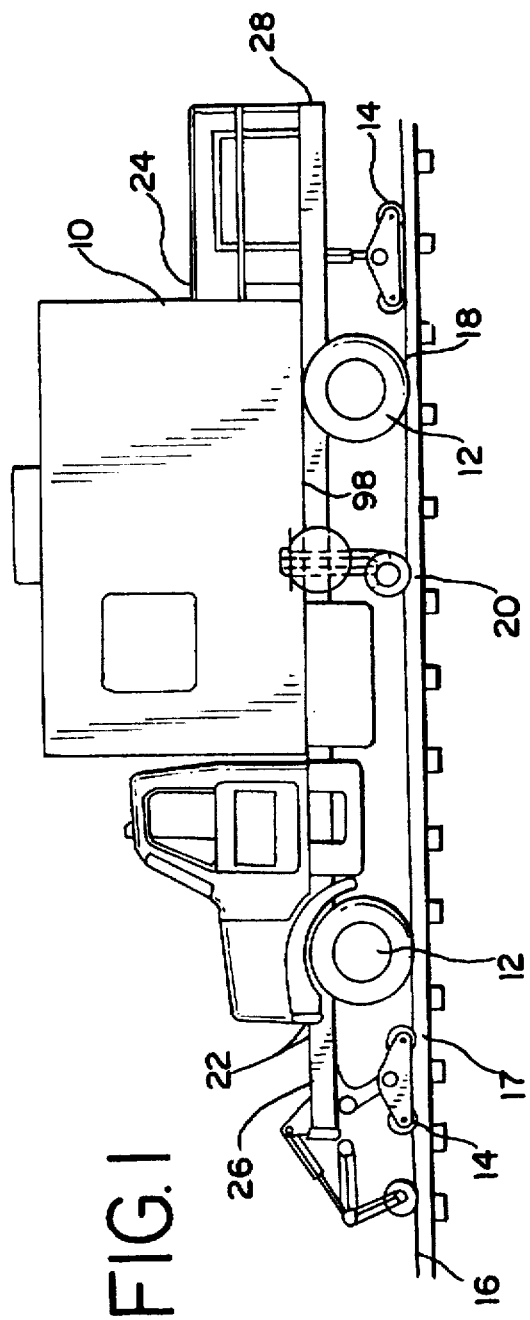
FIG. 1 is a side elevational view of the motor vehicle and loaded gage axle track strength apparatus on a railroad track.
Figure 9:
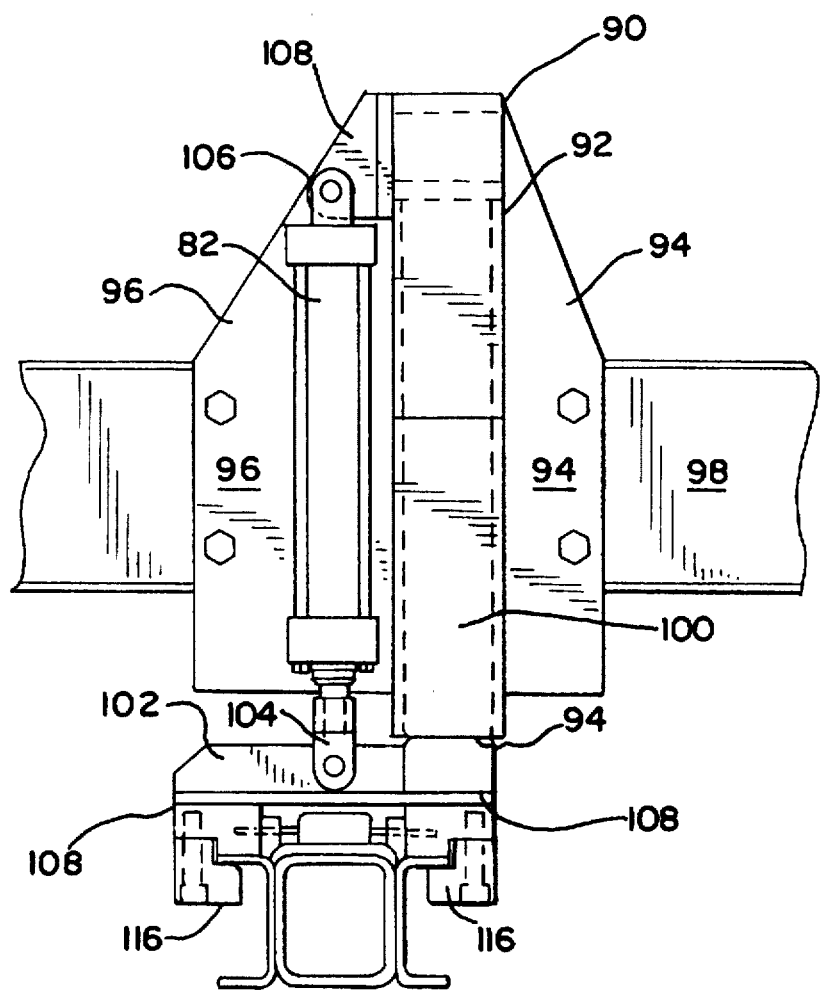
FIG. 9 is a left side elevational view of the loaded gage axle track strength apparatus with the split axle and wheel removed.

The truck vehicle 10 has road wheels 12 and high rail wheels 14. This arrangement enables operation of the vehicle on ordinary roads, driving to railroad tracks 16 and straddling them, then actuating the retractable high rail wheels 14 to partially lift the truck off the rails 17. Motive drive is nevertheless still provided with the road wheels through the rubber tires 18. This avoids the expensive and complicated alternative of providing a plurality of different transmission and drive train take off arrangements. The resilience of the rubber tires also provides drive flexibility in such circumstances as rounding curves without requiring a drive train to pivot and differentially drive around the varying radii of the inner and outer rails 17.

The invention embodies the placement of the gage axle assembly 20 between the truck wheels 12. Prior art using mobile vehicles put the gage axle assembly at the rear, often in conjunction with the high-rail unit. This prior art situation creates disadvantages by creating side loads and less easy to control sideward movement such as when the vehicle rounds a curve.

The specific design of the vehicle 10 of the invention places the high rail units 14 forward of the front end 22 and rearward of the rear end 24 of the vehicle. By displacing the high rail units 14 some distance forward of the front end 22 on a front frame extension 26 and rearward of the rear end 24 on a corresponding frame extension 28 improved tracking ability may be obtained, an improved drive arrangement can be used and a somewhat smaller, more compact truck 10 be utilized for economy and efficiency while having performance of a larger vehicle while nevertheless providing a superior platform for gage axle assembly 20.

In order to take advantage of the aforementioned improvements in vehicle operation it is further advantages to have an improved gage axle assembly 20. The gage axle assembly 20 is used to apply a calibrated side load on the tracks 16. Variations in side load are measured and the measurements analyzed to determine the strength of the track 16. A downward load is also placed on the gage axle assembly, primarily to maintain proper contact with the tracks to insure the accuracy of the side load measurements and avoiding having the gage axle assembly ride up off the tracks 16 with variations in the track surface and direction. The loaded gage axle assembly 20 uses a split axle assembly 30 made up left and right square sectioned shafts 32, 34 each having a spindle 36, 38 on its outboard end 40, 42.

Carried on spindles 36, 38 and rotatably supported by bearings 44, arranged both to support vertical load and bear thrust loads, are wheels 46. Wheels 46 have their contoured or tapered surfaces 48 angled so as to diverge toward flange 50 for better control over contact of flange 50 with rail 17, especially to enable rounding of curves on the rails while exerting sufficient side force for accurate measurement. Bearings 44 are fitted wholly inside wheel 46. The tread taper is the same as a typical railcar wheel, however the flanges of the wheels of the loaded gage axle are tapered at an angle of about 11 degrees for better tracking without climbing. Bearing races 49 and 51 in the wheel 96 and on the spindle 36, 38 are formed to have thrust and support surfaces so that the vertical load is appropriately transmitted through the support surfaces and the transverse loads, both outward and inward are also appropriately transmitted.

At the inboard ends 52, 54 a hydraulic ram 56 is attached to clevis and pin fittings 58, 60. Ram 56 provides the outward force to contact flange 50 with rail 17 and to maintain the load while wheels 46 rotate and follow track 16. Shafts 32, 34 are carried on a ultra high molecular weight (UHMW) plastic slides 62, 64 configured in two sizes to bear shafts 32, 34 with minimal friction in square housing 66. These slides 62, 64 are shaped to fit scallop cuts formed in the interior square section part of shafts 32, 34 and form self-lubricating bearing surfaces for shafts 32, 34. The entire split axle assembly 30 is contained within the housing 66 thereby providing a substantially, entirely enclosed, weather protected and compact unit.

Split axle shafts 32, 34 contained within housing 66 are of a square section and transition to cylindrical section spindles 36, 38 at the end where the wheel 46 is mounted on bearings 44. Movement transversely in and out of housing 66 is greatly controlled and strength, including resistance to vertical deflection is maximized for maximum precision in applying the load.

As wheels 46 bear against rails 17 imposing a side load, and transverse movement of the rails occurs, distortion or variation in hydraulic pressure is measured. The measuring is accomplished by comparing force measured by a linear transducer 68 on the hydraulic line 70 pressuring ram 56. The track gage is measured with linear transducer 68 while under a constant lateral load. This measurement is compared to an unloaded gage measurement and a delta gage or a rail movement is computed. The computations are made using electronic data recording and comparing apparatus 72 conveniently located in van body 74 of truck 10. Signals from the transducer are transmitted through connections adapted to be operatively connected to electronic data recording and comparing apparatus. These calculations correspond to the strength of the track 16—rails 17 on track 16 that move less in a sidewards direction are stronger than track with rails 17 that move more in a sidewards direction.

The vertical support and control arrangement 78 is also important. In the prior art, downward movement of the loaded gage axle was by a scissors or other lever based arrangements which made calculation of loads exceedingly complicated. In the invention, housing 66 is mounted so as to be totally floating transversely on rollers 80 so it can follow curves in the rails 16. Rollers 80 are at the bottom of vertical load cylinders 82 and engage guide bars 83 which controls the described transverse movement permitted by rollers 80. This free transverse movement permits taking advantage of and is enhanced by the central location of gage axle assembly 20 on truck 10 between the wheels 12.

Vertical load cylinders 82 are variable for pressure and accordingly the load downwardly is limited essentially only by the weight of the vehicle. Because the load is imposed directly downwardly, it is more easily calibrated and measured by vertical transducer arrangements.

The vertical load axle post/truck mounting bracket 90 has includes slide column 92 vertically slidably carrying load axle stabilizing leg 94. Flanges 94 and 96 permit mounting to truck frame 98.

Load axle stabilizing leg 94 includes a square section vertical member 100 and a forwardly extending arm 102 to which lower clevis 104 of cylinder 82 is mounted. Top clevis 106 is mounted to a lug 108 on bracket 90.

Each vertical support and control arrangement 78 includes has a pair of roller mounting plates 108 mounted to arm 102. In the preferred embodiment, this is by welding, however, other methods of attachment could be used. One roller mounting plate 108, carrying rollers 80 is mounted on either side of guide bars 83.

It will be noted that gage axle 20 is fabricated using square housing 66 a top plates 110 and front and rear channels 112 and 114 respectively.

Up-kick lugs 116 are in turn mounted to roller mounting plates, also straddling the top flanges of channels 112 and 114. Up-kick lugs 116 are preferably bolted to roller mounting plates 108. These provide ample clearance for the sidewards movement of gage axle 20 to follow tracks 16, with the downward force on wheels 46 imparted through vertical rams 82 and vertical support and control arrangement 78 through rollers 80 to top plate 110 and bearings 44.

When axle 20 is raised from contact with the rails, it is supported from up-kick lugs 116.

A flange lubricator bracket 120 and its supporting web 122 hold lubricators 124 which apply an appropriate lubricant to wheels 44 to reduce friction and assure consistent contact with track 16.

While several embodiments have been shown and described with respect to the present invention, it should be understood that the present invention is not limited to these embodiments, but rather is susceptible to numerous changes and modifications as known to those skilled in the art. Therefore, we do not wish to be limited to the detail shown and described herein, and intend to cover all such changes and modifications as are encompassed by the scope of the appended claims.

In accordance with our invention, we claim:

1. A road motor vehicle for testing railroad track strength having a first set of road wheels and a second set of road wheels adapted for use on railroad tracks by being elevated by extendible rail contacting wheels comprising:

supplying the motive force for the vehicle through at least one set of the vehicle's road wheels;

positioning between said sets of road wheels a loaded gage axle assembly for measuring track strength by measuring side loads applied to the tracks;

imposing vertical loads on said loaded gage axle assembly by a vertical hydraulic ram;

supplying horizontal loads through said gage axle assembly with a horizontal ram through a split axle and flanged wheels to the railroad tracks;

said gage axle assembly being calibrated to measure track strength by measuring movement of said flanged wheels;

said horizontal ram being operatively connected to a transducer and said transducer being operatively connected to electronic data recording and comparing apparatus whereby said track strength is analyzed.

2. The invention according to claim 1, said gage axle assembly further comprising:

said gage axle assembly being mounted to a frame of said vehicle;

a horizontal housing containing said split axle slidably therein;

a vertical load assembly having a first end mounted to the vehicle by a frame and a second end opposite said first end, said vertical load assembly carrying said horizontal housing permitting vertical movement thereof;

a horizontally slidable interconnection between said horizontal housing and said vertical load assembly said interconnection being located at said second end of said vertical load assembly.

3. The invention according to claim 2 said vertical load assembly further comprising:

a load axle stabilizing leg mounted to said frame adjacent said first end and to said slide adjacent said opposite end;

a ram substantially parallel to said slide column mounted to said frame adjacent said first end and to said slide adjacent said opposite end;

a strut adjacent said opposite end projecting forwardly from said column and interconnecting said ram and said column;

whereby said ram provides a vertical load to contact said wheels to said rails.

4. The invention according to claim 1, said split axle further comprising:

a first shaft and a second shaft each having an inner end and an outer end;

said first shaft and said second shaft being interconnected between said inner ends and driven by said horizontal ram;

a first spindle on the outer end of the first shaft and a second spindle on the outer end of the second shaft;

said first spindle and said second spindle being rotatably and thrustably connected to said flanged wheels;

said ram interconnecting said first shaft and said second shaft for forcing said shafts outwardly;

said transducer for sensing loads on said rams being calibrated to sense changes in track gage while said hydraulic ram maintains a constant lateral load.

5. The invention according to claim 1, further comprising:

said split axle being transversely slidably mounted in a housing of said gage axle assembly;

said split axle having an exterior surface and said housing having an interior surface;

said exterior surface being formed to have a scalloped recess;

said scalloped recess receiving an ultra high molecular weight plastic slide, said slide having a convex surface and a substantially flat bearing surface;

said convex surface corresponding to said scalloped recess and said bearing surface enabling reduced friction sliding of said split axle in said housing.

6. The invention according to claim 1, further comprising:

said flanged wheels having angled outer bearing races to bear both transverse and vertical loads;

said split axle having correspondingly angled inner bearing races to bear both transverse and vertical loads;

thrust and supporting bearings being operatively fitted between said inner and outer bearing races;

said wheel having a tapered flange for better contact of said flange with said rail while exerting sufficient side force for accurate measurement.

7. A loaded gage axle assembly for measuring the strength of railroad tracks comprising:

a gage axle assembly mountable to a frame of a vehicle, the vehicle being adapted to move on railroad tracks;

a horizontal housing containing a split axle slidably therein;

a vertical load assembly having a first end mounted to the vehicle by a frame and a second end opposite said first end, said vertical load assembly carrying said horizontal housing permitting vertical movement thereof;

a horizontally slidable interconnection between said horizontal housing and said vertical load assembly said interconnection being located at said second end of said vertical load assembly.

8. The invention according to claim 7, said split axle further comprising:

a first shaft and a second shaft each having an inner end and an outer end;

said first shaft and said second shaft being interconnected between said inner ends and driven by said horizontal ram;

a first spindle on the outer end of the first shaft and a second spindle on the outer end of the second shaft;

said first spindle and said second spindle being rotatably and thrustably connected to said flanged wheels;

said ram interconnecting said first shaft and said second shaft for forcing said shafts outwardly;

said transducer for sensing loads on said rams being calibrated to sense changes in track gage while said hydraulic ram maintains a constant lateral load.

9. The invention according to claim 8 said vertical load assembly further comprising:

a load axle stabilizing leg mounted to said frame adjacent said first end and to said slide adjacent said opposite end;

a ram substantially parallel to said slide column mounted to said frame adjacent said first end and to said slide adjacent said opposite end;

a strut adjacent said opposite end projecting forwardly from said column and interconnecting said ram and said column;

whereby said ram provides a vertical load to contact said wheels to said rails.

10. The invention according to claim 7, further comprising:

said split axle being transversely slidably mounted in a housing of said gage axle assembly;

said split axle having an exterior surface and said housing having an interior surface;

said exterior surface being formed to have a scalloped recess;

said scalloped recess receiving an ultra high molecular weight plastic slide, said slide having a convex surface and a substantially flat bearing surface;

said convex surface corresponding to said scalloped recess and said bearing surface enabling reduced friction sliding of said split axle in said housing.

11. The invention according to claim 7, further comprising:

said flanged wheels having angled outer bearing races to bear both transverse and vertical loads;

said split axle having correspondingly angled inner bearing races to bear both transverse and vertical loads;

thrust and supporting bearings being operatively fitted between said inner and outer bearing races;

said wheel having a tapered flange for better contact of said flange with said rail while exerting sufficient side force for accurate measurement.

* * * * *